United States Patent [19]

Levy et al.

[11] Patent Number: 5,795,360
[45] Date of Patent: Aug. 18, 1998

[54] APPARATUS FOR THE SEPARATION OF TOBACCO LAMINA FROM AN AIR STREAM

[75] Inventors: Sam Levy; James H. Lowe, Jr., both of Richmond, Va.

[73] Assignee: Mactavish Machine Manufacturing Co., Richmond, Va.

[21] Appl. No.: 607,014

[22] Filed: Feb. 26, 1996

[51] Int. Cl.$^6$ .................................................. B01D 45/00
[52] U.S. Cl. .................... 55/408; 55/502; 55/432
[58] Field of Search .......................... 55/408, 290, 302, 55/502, 354; 210/402

[56] References Cited

U.S. PATENT DOCUMENTS

| | | | |
|---|---|---|---|
| 1,581,363 | 4/1926 | Streun | 55/408 |
| 2,989,146 | 6/1961 | Lundy | 55/408 |
| 3,443,696 | 5/1969 | Schutte | 55/408 |
| 3,658,048 | 4/1972 | Eckhardt | 126/21 |
| 4,093,242 | 6/1978 | Terry | 277/58 |
| 4,377,401 | 3/1983 | Laughlin | 55/290 |
| 4,465,194 | 8/1984 | Coleman | 209/639 |
| 4,729,724 | 3/1988 | Henning et al. | 417/423 R |
| 4,750,548 | 6/1988 | Albers et al. | 165/95 |
| 4,787,831 | 11/1988 | Thomas et al. | 418/104 |
| 5,073,177 | 12/1991 | Brouwers | 55/408 |
| 5,205,847 | 4/1993 | Montieth et al. | 55/294 |

FOREIGN PATENT DOCUMENTS

| | | | |
|---|---|---|---|
| 2802369 | 7/1979 | Germany | 55/290 |
| 764817 | 3/1955 | United Kingdom | 55/408 |

*Primary Examiner*—Jay H. Woo
*Assistant Examiner*—Robert Hopkins
*Attorney, Agent, or Firm*—Norman B. Rainer

[57] ABSTRACT

A lamina/air separator for use atop apparatus for removing tobacco lamina from a lamina/stem mixture includes a horizontally disposed perforated cylindrical drum rotatively secured within a housing having sidewalls containing air exit ports adjacent the extremities of the drum. A sealing assembly interactive between each extremity of the drum and associated sidewall utilizes two flexed sealing strips to create a stagnant zone, bounded in part by the sidewall, that envelopes the extremity of the drum.

9 Claims, 3 Drawing Sheets

APPARATUS FOR THE SEPARATION OF TOBACCO LAMINA FROM AN AIR STREAM

BACKGROUND OF THE INVENTION

1. Field of the Invention

This invention relates to the handling of tobacco materials, and more particularly concerns apparatus for separating pieces of tobacco lamina material from a transporting stream of processing air.

2. Description of the Prior Art

In the production of cigarettes, dried and cured whole tobacco leaves are subjected to a threshing operation which fragments the leaf into a mixture of leafy or lamina pieces, and heavier pieces referred to as stem or midrib material. The lamina pieces, which are of thin, filmy configuration, represent the valuable component for use in the production of cigarettes. The stem material, generally of elongated and relatively thick configuration is relatively undesirable for use in cigarette production. It is therefore sought to separate the lamina material from the stem material.

In general, devices employing air currents to separate tobacco lamina from stem material are well known. Examples of such devices include those disclosed in U.S. Pat. No. 4,454,194 to Coleman, U.S. Pat. No. 3,608,716 to Rowell, U.S. Pat. No. 3,265,210 to Haite et al, and U.S. Pat. No. 5,427,248 to Levy et. al. In such separator devices, a threshed mixture is entered into a separation chamber where it is acted upon by an upward flow of air. The aerodynamically lighter lamina pieces are carried upwardly by the air current whereas the heavier stem material falls to a lowermost region of the chamber.

The upwardly transported pieces of lamina must be separated from the processing stream of air. This is preferably done in a manner permitting the air stream to return in a closed circuit to the separation chamber. By virtue of such closed circuit operation, the kinetic energy of the air stream is retained, the heated air of the building is conserved, and minimal dust-laden processing air escapes into the building. The lamina material which is removed from the air stream preferably falls by gravity onto means such as a conveyor belt which collects and transports the tobacco.

Because some lamina material may still be admixed with the stem material effluent from any one particular separator apparatus, said stem effluent is usually forwarded to another similar separator machine. Such series treatment may continue for several separator machines in a linear sequence wherein the tobacco advances in the same general direction through said sequence of machines. The aforesaid means for collecting and transporting the lamina tobacco in such sequenced separator machines preferably conveys the tobacco in a direction transverse to the general direction of tobacco advanced through said machines.

Apparatus for achieving the separation of aerodynamically light particles such as paper from an air stream is disclosed in U.S. Pat. No. 5,205,847 to Montieth et al., wherein a housing encloses a drum that has a perforated cylindrical sidewall and is supported for rotation on a horizontal axis. Conduits convey into said housing streams of air having suspended small scrap pieces of paper. The air passes through the perforated sidewall and exits one axial extremity of the drum. The paper pieces deposit upon the exterior of the sidewall and are blown downwardly away from the sidewall by stationary air jet means located within the drum. Both extremities of the drum are sealed to the surrounding housing by interleaved rigid flange-like rings.

The aforesaid Coleman and Levy et al patents disclose the use of a tobacco lamina/air separator device positioned atop the apparatus which separates tobacco lamina from tobacco stem. Said lamina/air separator is constructed and operated in a manner to recycle the air stream and discharge the lamina downwardly through a rotary air lock device. In both the Coleman and Levy et al patents, the lamina-entraining air stream enters the lamina/air separator tangentially above a perforated cylindrical drum rotating within a confining housing. By virtue of such construction and operation, most of the tobacco is centrifugally thrown against the rear wall of the housing, and descends to said rotary air lock device for controlled removal from the housing. Such mode of function is distinctly different from that of the aforesaid Montieth et al apparatus, wherein the material separated from the air stream is deposited upon the perforated drum. The centrifugal principle of operation enables the air lock device to perform more efficiently, but places considerable performance demand upon sealing means interactive between the rotating drum and stationary housing. The deposition of lamina upon the rear wall of the housing is even more pronounced in the Levy et al separator because air exits the housing from both extremities of the drum.

It is accordingly an object of the present invention to provide an improved lamina/air separator for use in association with apparatus for separating tobacco lamina from stem.

It is a further object of this invention to provide a lamina/air separator as in the foregoing object which employs a perforated cylindrical drum that rotates within a stationary confining housing.

It is another object of the present invention to provide a lamina/air separator of the aforesaid nature configured to receive a lamina-entraining air stream tangentially above said drum.

It is a still further object of this invention to provide a lamina/air separator of the aforesaid nature having efficient sealing means interactive between said rotating drum and stationary housing.

It is yet another object of the present invention to provide a lamina/air separator of the aforesaid nature wherein said sealing means are easily accessible for maintenance purposes.

These objects and other objects and advantages of the invention will be apparent from the following description.

SUMMARY OF THE INVENTION

The above and other beneficial objects and advantages are accomplished in accordance with the present invention by a lamina/air separator for use atop apparatus for removing tobacco lamina from a lamina/stem mixture employing a recirculating air current and producing a lamina-entraining air stream, said separator comprising:

1) a stationary housing defined by opposed sidewalls, front and rear walls, top portion and lower extremity, said housing being elongated horizontally between said sidewalls, each sidewall being bounded by an interiorly directed face and opposed exteriorly directed face, 2) an elongated entrance port disposed within said front wall adjacent said top portion, and extending between said sidewalls, 3) an elongated lamina discharge port disposed at said lower extremity and extending between said sidewalls, 4) an air exit port disposed in each sidewall and having an uppermost extremity located in substantially tangential alignment with said entrance port,

3

5) a perforated drum of circular cylindrical configuration bounded by interior and exterior surfaces and extending upon a center axis of rotation between opposed open extremities which communicate with said air discharge ports, and 6) a sealing assembly interactive between each extremity of said drum and the corresponding sidewall, each sealing assembly comprised of:
   a) a first resilient sealing strip encircling the exterior surface of said drum and attached thereto, said strip extending outwardly from the drum and resiliently urged toward said axis and into sliding contact with the interiorly directed face of said sidewall,
   b) a second circular resilient sealing strip disposed within and secured to said drum adjacent said interior surface and resiliently urged toward said axis, and a stationary annular flange supported by the exteriorly directed face of said sidewall and positioned to be slideably contacted by said second strip.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
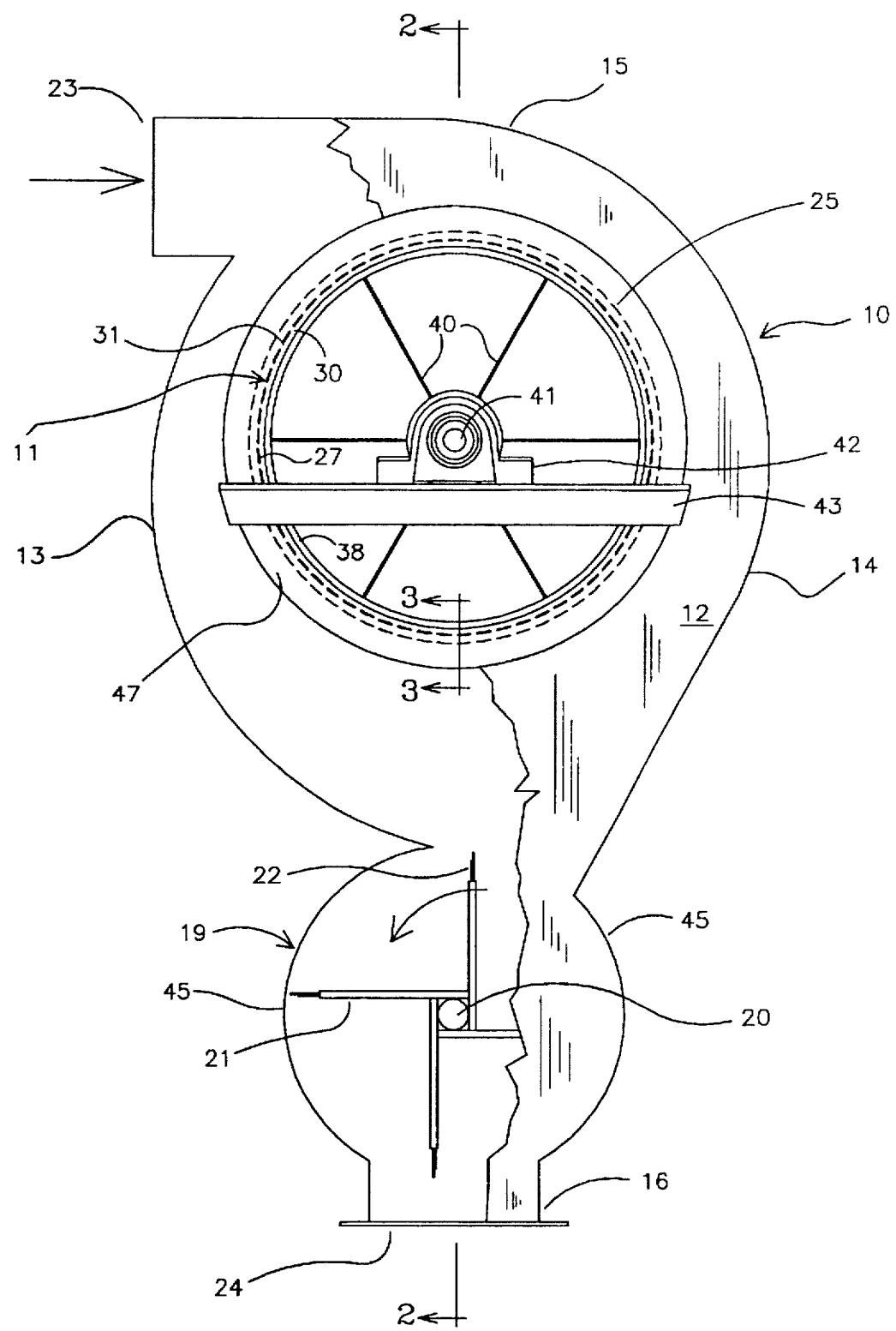
FIG. 1 is a side view of an embodiment of the lamina/air separator of the present invention with portions broken away to reveal internal details.
Figure 2:
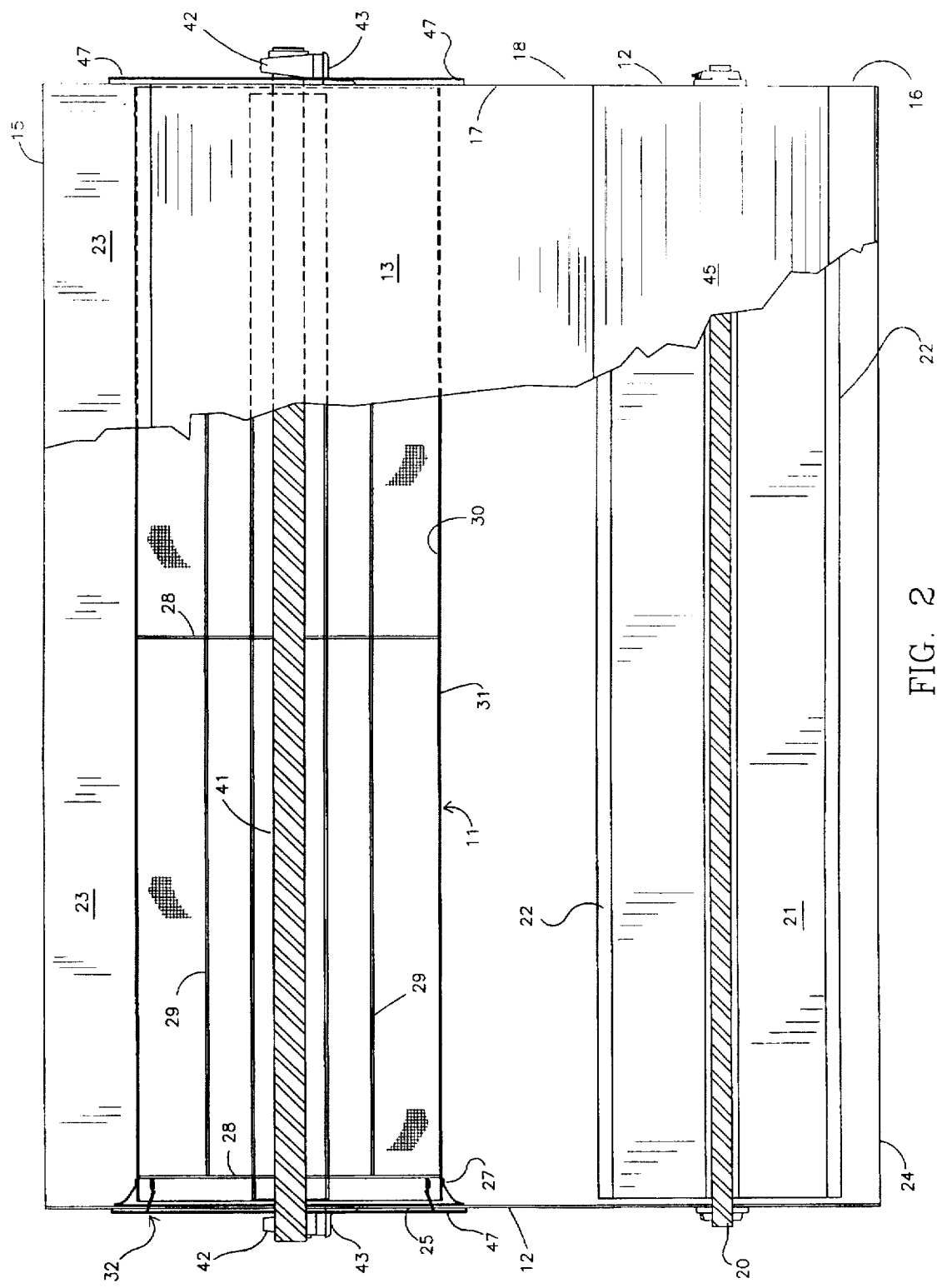
FIG. 2 is a front and partial vertical section view taken upon the line 2—2 of FIG. 1.
Figure 3:
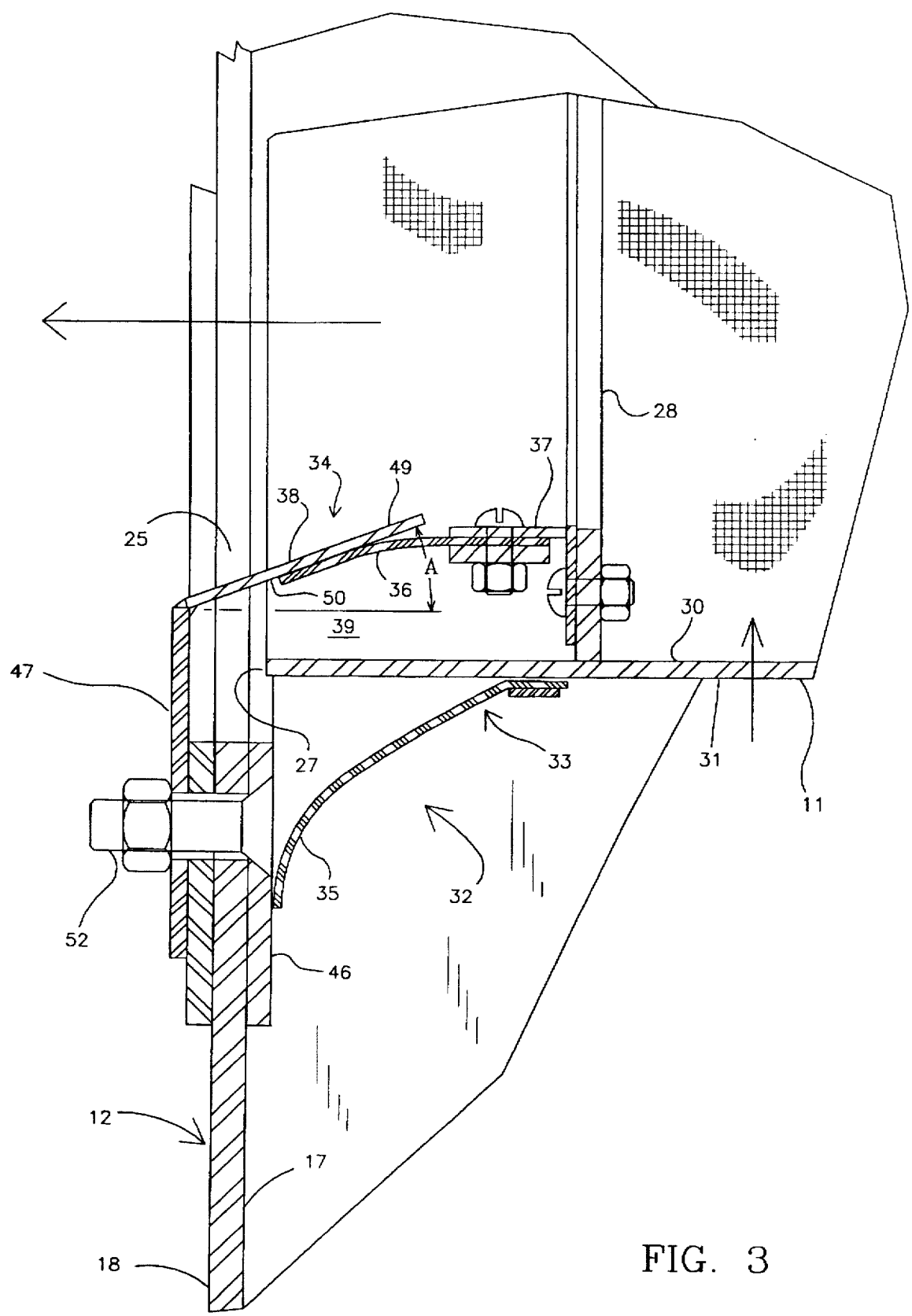
FIG. 3 is an enlarged fragmentary sectional view taken in the direction of the arrows upon the line 3—3 of FIG. 1.

Referring now to FIGS. 1-3, an embodiment of the lamina/air separator apparatus of the present invention is shown comprised of stationary housing 10 and air-permeable drum 11 rotatively secured within said housing.

Housing 10, constructed preferably from sheet metal panels, is comprised of opposed sidewalls 12, front and rear walls 13 and 14, respectively, top portion 15, and lower extremity 16. As shown in FIG. 1, said front and rear walls may be of arcuate construction, and top portion 15 may be a continuous integral extension of rear wall 14. The several panels involved in the construction of housing 10 are preferably joined by way of bolting at the corners defined by the meeting of their edge extremities. Sidewalls 12 and the several other panels involved in the construction of housing 10 have an interiorly directed face 17 and opposed exteriorly directed face 18. Housing 10 is horizontally elongated between said sidewalls. A rotatable air-lock exit feeder 19 is disposed within said housing adjacent lower extremity 16. Exit feeder 19 is comprised of motor-driven central shaft 20 which secures paddle blades 21 having straight distal edges 22 adapted to make close-fitting sliding contact with retainer wall portions 45 disposed upon a circular locus about said shaft.

An elongated entrance port 23 is disposed within front wall 13 adjacent top portion 15, and extends between said sidewalls but not necessarily in communication therewith. Said entrance port is adapted to receive a stream of lamina-entraining air from a preceding lamina/stem separating

4 apparatus, said air stream typically having a velocity in the range of 3 to 5 thousand feet/min. An elongated lamina discharge port 24 is disposed at lower extremity 16 of said housing, and extends substantially between said sidewalls. Said discharge port 24 is adapted to permit lamina material accumulated by exit feeder 19 to fall by gravity effect from housing 10. Said lamina, downwardly emergent from discharge port 24 lands upon a conveyor belt (not shown) that is beneath and parallel to said discharge port, and accordingly transports the lamina in a direction transverse to the direction of flow of lamina into entrance port 23.

An air exit port 25 is disposed in each sidewall. Said exit ports are preferably of circular contour and have an uppermost extremity that is in substantially tangential alignment with said entrance port. Ductwork of conventional design is attached to the exteriorly directed faces of said sidewalls to receive air emergent from ports 25.

Air-permeable drum 11 is preferably of circular cylindrical configuration, having a length to diameter ratio between about 4 and 6, and extending upon a center axis of rotation between opposed open extremities 27 that communicate with air exit ports 25. The air-permeable nature of the drum is achieved preferably by virtue of perforations small enough to prevent passage of lamina material. The perforations may be of circular, slotted, or other configuration. The drum is further characterized in having interior and exterior surfaces 30 and 31, respectively.

The interior surface of the exemplified embodiment of drum 11 is provided with structurally reinforcing members such as axially spaced circular bands 28 and circumferentially spaced, axially aligned straight bars 29. Radially directed spokes 40 extend between the interior surface of the drum and axially centered drive shaft 41. Said drive shaft is journaled to pillow blocks 42 supported by cross beams 43 attached to said sidewalls.

A sealing assembly 32 is interactive between each extremity of drum 11 and the corresponding sidewall. Each sealing assembly is comprised of first and second sealing members 33 and 34, respectively. Said first sealing member is comprised of first resilient strip 35 which encircles the exterior surface of said drum in attachment therewith. Strip 35 extends outwardly from the drum and is resiliently urged into sliding contact with the interiorly directed face 17 of said sidewall or with flat annular bearing disc 46 attached to said interiorly directed face, said bearing disc serving as a replaceable portion of sidewall 12.

Second sealing member 34 is comprised of second resilient strip 36 disposed in a circular locus adjacent the interior surface of said drum and attached to annular collar 37 displaced inwardly from said interior surface toward said axis and supported by circular band 28. Strip 36 is resiliently urged toward said axis and into sliding contact with a stationary annular flange 38 supported by footing disc 47 attached to the exteriorly directed face of sidewall 12. Flange 38 is defined by inside and outside surfaces 49 and 50 respectively. Strip 36 leans against outside surface 50. Flange 38 is preferably disposed at an angle A with respect to the drum, said angle having a value between about 10 degrees and 30 degrees. In some embodiments, said flange and footing disc may be comprised of mating upper and lower halves necessitated by the presence of crossbeam 43.

The flow of air through drum 11 is shown by arrowed lines in FIG. 3. It is to be noted that the first and second sealing members of each sealing assembly act in concert to define a stagnant zone 39 that surrounds circular edge extremity 27 of drum 11. Because of the blocking effect of the first sealing member and the inhibiting effect of zone 39, lamina particles are prevented from traveling around the extremity of the drum to enter the air stream emergent from exit port 25. The arrangement of said second sealing member is such as to expedite replacement of a worn sealing strip 36 by way of access through exit port 25. In the particular embodiment exemplified in FIG. 3, threaded bolts 52 are employed to removably secure footing disc 47 to the exterior surface 18 of each sidewall 12. Said bolts may also expedite replacement of worn bearing discs 46.

While particular examples of the present invention have been shown and described, it is apparent that changes and modifications may be made thereinwithout departing from the invention in its broadest aspects. The aim of the appended claims, therefore is to cover all such changes and modifications as fall within the true spirit and scope of this invention.

Having thus described our invention, what is claimed is:

1. A lamina/air separator for use with apparatus for removing tobacco lamina from a lamina/stem mixture employing a recirculating air current and producing a lamina-entraining air stream, said separator comprising:
   1) a stationary housing defined by opposed sidewalls, front and rear walls, top portion and lower extremity, said housing being elongated horizontally between said sidewalls, each sidewall being bounded by an interiorly directed face and opposed exteriorly directed face,
   2) an elongated entrance port disposed within said front wall adjacent said top portion,
   3) an elongated lamina discharge port disposed at said lower extremity,
   4) an air exit port disposed in each sidewall,
   5) an air-permeable drum of circular cylindrical configuration bounded by interior and exterior surfaces and extending upon a center axis of rotation between opposed open extremities which communicate with said air discharge ports, and
   6) a sealing assembly interactive between each extremity of said drum and the corresponding sidewall to define a stagnant zone that surrounds said extremity, each sealing assembly comprised of:
      a) a first resilient sealing strip encircling the exterior surface of said drum and attached thereto, said strip extending outwardly from the drum and resiliently urged toward said axis and into sliding contact with the interiorly directed face of said sidewall,
      b) a second circular resilient sealing strip disposed within said drum and resiliently urged toward said axis, and
      c) a stationary annular flange supported by the exteriorly directed face of said sidewall at an angle of between 10 and 30 degrees with respect to said drum and defined by inside and outside surfaces, said outside surface being positioned to be slideably contacted by said second strip.

2. The separator of claim 1 wherein the front and rear walls of said housing are of arcuate contour, and said top portion is a continuous integral extension of said rear wall.

3. The separator of claim 1 wherein an exit feeder is associated with said lamina discharge port, said exit feeder being comprised of a central shaft which secures radially directed paddle blades having distal edges adapted to make close-fitting contact with retainer wall portions disposed upon a circular locus about said shaft.

4. The separator of claim 1 wherein said air exit ports are of circular shape, having a diameter approximately the diameter of said drum.

5. The separator of claim 1 wherein said drum has a length to diameter ratio between 4 and 6 and has a drive shaft disposed upon said center axis.

6. The separator of claim 5 wherein the interior surface of said drum secures structurally reinforcing members including axially spaced circular bands and circumferentially spaced axially aligned straight bars.

7. The separator of claim 5 wherein radially directed spokes extend between the interior surface of said drum and said drive shaft.

8. The separator of claim 5 wherein said drive shaft is journaled to bearing means supported by cross beams attached to the exteriorly directed face of each sidewall.

9. The separator of claim 1 constructed in a manner to permit replacement of a worn sealing strip by way of access through a respective air exit port.

* * * * *